United States Patent

[11] 3,602,876

| [72] | Inventor | Robert D. Gerard<br>Palisades, N.Y. |
|---|---|---|
| [21] | Appl. No. | 822,321 |
| [22] | Filed | May 6, 1969 |
| [45] | Patented | Aug. 31, 1971 |
| [73] | Assignee | The United States of America as represented by the Secretary of the Navy |

[54] METHOD OF DETERMINING TERMINAL VELOCITY OF A FREE-FALLING BODY
1 Claim, 1 Drawing Fig.

[52] U.S. Cl............................................. 340/5 R, 340/3 D
[51] Int. Cl.......................................... H04b 11/100
[50] Field of Search.............................. 340/3 D, 5, 5 S; 343/112.5

[56] References Cited
UNITED STATES PATENTS

| 1,785,307 | 12/1930 | Hammond, Jr.............. | 340/3 D |
| 2,914,730 | 11/1959 | Nadler et al................ | 340/3 D |
| 3,341,808 | 9/1967 | Levin et al................... | 340/5 |
| 3,453,625 | 7/1969 | Zakheim et al............. | 343/112 (.5) |

*Primary Examiner*—Richard A. Farley
*Attorneys*—R. I. Tompkins, L. I. Shrago and C. E. Vautrain, Jr.

ABSTRACT: The disclosure concerns a method for determining the terminal velocity in water of bodies having various hull shapes through the use of doppler techniques wherein a coherent oscillator on the body is matched with a reference oscillator and the signals from the oscillators are mixed during fall. A stable doppler frequency occurs at terminal velocity and the cessation of doppler frequency indicates that the body has impacted on the bottom or the run is ended.

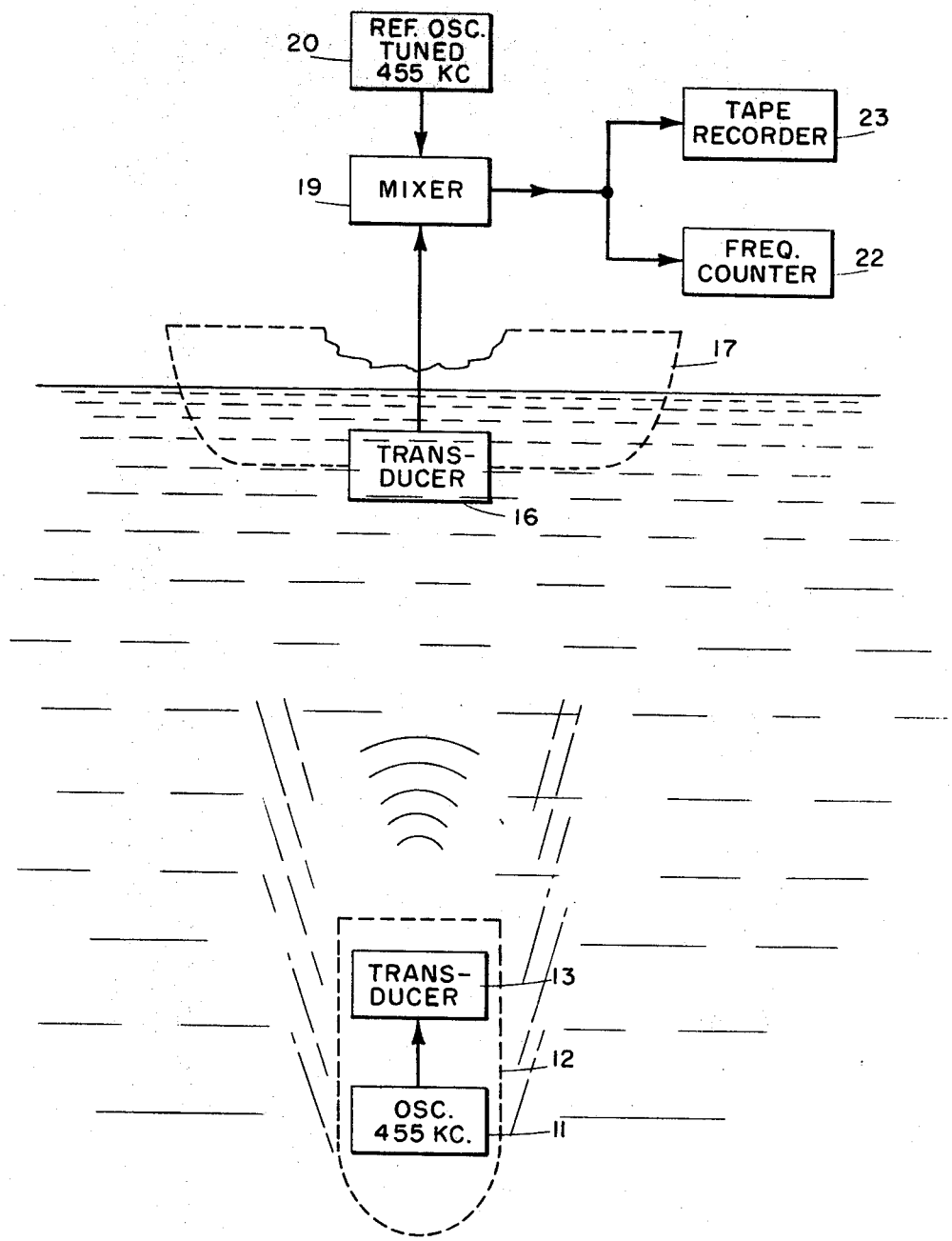

METHOD OF DETERMINING TERMINAL VELOCITY OF A FREE-FALLING BODY

The invention described herein may be manufactured and used by or for the Government of the United States of America for governmental purposes without the payment of any royalties thereon or therefor.

The present invention concerns a method for determining the terminal velocity of test bodies having various hull shapes in free-fall model testing by the use of doppler techniques.

Conventional methods for evaluating various hull shapes for high-speed underwater vehicles include the dropping of test models or the ascent of test models, the motion parameters of the bodies being detected by an array of hydrophones or transducers suspended on a nearby cable or by other linearly deployed detecting equipment so that at specified points in the path of the bodies can be detected to be later determined by time-distance computation. These tests require an extensive array of detecting equipment plus instrumentation to monitor the fall detecting at least two distinct parameters and converting these parameters into motion determinations. The instrumentation required is frequently cumbersome, inconvenient and difficult to deploy and generally lacks desired accuracy, versatility and ease of data reduction.

The present invention overcomes the disadvantages of prior techniques for determining intermediate velocity changes as well as terminal velocity in negatively buoyant bodies in free fall or in positively buoyant bodies in ascent by a novel application of the doppler effect whereby changes in doppler frequency indicate rate of acceleration or deceleration; a constant doppler indicates terminal velocity and cessation of doppler indicates impact or the end of a run.

Accordingly, it is an object of the present invention to provide a novel method for determining the intermediate and terminal velocity of test bodies in free fall or free ascent model testing using the doppler effect.

Another object of the present invention is to provide a simplified method for determining terminal velocity in water of test bodies including high-speed underwater hull shapes in free-fall model testing using the doppler effect.

Other objects, advantages and novel features of the invention will become apparent from the following detailed description thereof when considered in conjunction with the accompanying drawing.

The present invention comprises utilizing the doppler effect primarily to determine terminal velocity. Referring to the drawing, a coherent oscillator 11 of high frequency acoustic energy is mounted on the body model indicated at 12 to be tested and connected to a conventional transducer 13 operable at a selected frequency. A second transducer such as hydrophone 16 may be mounted in a stable platform 17 in the medium in which testing is to be done or may be otherwise fixed in relation thereto. The signals received by transducer 16 are mixed in a mixer 19 with signals from a reference tuned oscillator 20 to obtain the doppler effect. The resulting signals are measured by a frequency counter 22. Reference oscillator 20 is adjustable in frequency to zero-beat with the signal received from oscillator 11. The body then when dropped in free fall descends along a path which has been predetermined to be substantially directly beneath hydrophone 16 in stable platform 17. As the body falls, transducer 13 emits signals which are received by hydrophone 16. As the test body moves away from the receiving hydrophone, the doppler frequency of the mixed signals rises during acceleration stages and then becomes steady when a stable terminal velocity has been reached. The end of the run is indicated by a cessation of the doppler frequency. If desired, a tape recorder 23 may be provided to record the difference in frequency or "doppler shift" of the falling model. Where a tape record is made of the frequencies occurring during fall, the tape provides a detailed chronological account of the acceleration of the falling body before reaching terminal velocity and, of course, of the final terminal velocity. Perturbations in the path of the falling body can also be identified over the signals emitted by transducer 13 or other sound signal source and analyzed.

In one embodiment, a small battery-powered, acoustic oscillator was placed in the tail section of a model to be dropped in free fall. The transducer was one of several commercially available pingers. Before beginning the tests, adjusted to zero-beat with the signal received from the test model oscillator 11. The two signals were mixed and the output was fed to a tape recorder and a frequency counter simultaneously. When the model was held motionless with respect to the receiving transducer, no frequency was generated in the mixer and, therefore, none was recorded on tape. As the model moved away from the receiving transducer during free fall, the doppler frequency rose during acceleration stages and became stable when the terminal velocity or maximum velocity of the body was reached. Data on the free fall was immediately available in the frequency counter and was recorded on tape for immediate analysis at the remote location. The method thus provided for a rapid acquisition of free-fall data received through a very simplified system and yet produced highly accurate and detailed information, in relation to conventional methods, from which characteristics of a variety of hull shapes may be deduced.

This invention therefore provides continuous free-fall data, which are susceptible to rapid and thorough analysis, and permits real time monitoring of the data. The equipment used in the practice of the method is readily available commercially as it is used by scuba divers for communications and safety purposes, and it is, therefore, relatively inexpensive. The beacons or pingers are self-contained, battery-powered and of small size so that they may be readily placed within a small scale model.

It will be appreciated that, although conventional equipment at a designated frequency has been described, other frequencies may be used where appropriate and that specially designed equipment may be provided to produce optimum results in selected circumstances. That is, frequencies may be selected that are commensurate with the depth over which hull characteristics are desired to be evaluated yet not exceeding ranges at which substantial signal attenuation occurs. The method of the present invention therefore is applicable to tests either in the environment or at artificial sites such as experimental testing tanks.

Obviously many modifications and variations of the present invention are possible in the light of the foregoing teachings. For example, additional hydrophones or transducers may be used at the surface to afford detailed examination of the three-dimensional path of a test body dropping in some path other than vertical.

What is claimed is:

1. The method of determining the terminal velocity in water of bodies having various hull shapes comprising the steps of:
generating and transmitting acoustic signals on and from a body in free fall in a fluid environment;
directing said acoustic signals substantially vertically upward from said body;
receiving said acoustic signals in receivers deployed at a selected number of spaced reference points at the surface of the water substantially directly over said falling body;
mixing said acoustic signals with signals from a reference oscillator tuned to the frequency of the signals generated in said body at each of said reference points so that data may be obtained to multidimensionally define the path of the falling body;
detecting the doppler effect during acceleration of said body; and
determining the free-fall velocity of said body at and during the interval of steady doppler.